US012587817B2

(12) United States Patent

Liu

(10) Patent No.: US 12,587,817 B2
(45) Date of Patent: Mar. 24, 2026

---

(54) BLUETOOTH CONNECTION METHOD AND APPARATUS, WEARABLE DEVICE, AND COMPUTER-READABLE STORAGE MEDIUM

(71) Applicant: GUANGDONG OPPO MOBILE TELECOMMUNICATIONS CORP., LTD., Dongguan (CN)

(72) Inventor: Enfu Liu, Dongguan (CN)

(73) Assignee: GUANGDONG OPPO MOBILE TELECOMMUNICATORS CORP., LTD., Dongguan (CN)

( * ) Notice: Subject to any disclaimer, the term of this patent is extended or adjusted under 35 U.S.C. 154(b) by 928 days.

(21) Appl. No.: 17/806,057

(22) Filed: Jun. 8, 2022

(65) Prior Publication Data

US 2022/0303746 A1 Sep. 22, 2022

Related U.S. Application Data

(63) Continuation of application No. PCT/CN2020/135071, filed on Dec. 10, 2020.

(30) Foreign Application Priority Data

Dec. 26, 2019 (CN) .......................... 201911365784.7

(51) Int. Cl.
| | |
|---|---|
| *H04W 4/80* | (2018.01) |
| *H04B 1/3827* | (2015.01) |
| *H04W 76/14* | (2018.01) |

(52) U.S. Cl.
CPC .............. *H04W 4/80* (2018.02); *H04B 1/385* (2013.01); *H04W 76/14* (2018.02)

(58) Field of Classification Search
CPC ......... H04W 4/80; H04W 67/14; H04B 1/385
(Continued)

(56) References Cited

U.S. PATENT DOCUMENTS

| | | | | |
|---|---|---|---|---|
| 9,788,144 | B1 * | 10/2017 | Anantharaman | ..... H04L 67/565 |
| 10,930,133 | B1 * | 2/2021 | Chen | ...................... G01S 11/06 |

(Continued)

FOREIGN PATENT DOCUMENTS

| | | |
|---|---|---|
| CN | 105472542 A | 4/2016 |
| CN | 105516902 A | 4/2016 |

(Continued)

OTHER PUBLICATIONS

Extended European search report issued in corresponding EP application No. 20906070.6 dated Dec. 14, 2022. 7 pages.

(Continued)

*Primary Examiner* — April G Gonzales
(74) *Attorney, Agent, or Firm* — PERKINS COIE LLP

(57) ABSTRACT

The present application relates to a Bluetooth connection method and apparatus, a wearable device, and a computer-readable storage medium. The methods are provided as follows. When a first system is running, a terminal is paired by a first Bluetooth module, so as to obtain a terminal identifier corresponding to the terminal. A mode switching instruction is obtained, and the first system and the first Bluetooth module is turned off according to the mode switching instruction, and a second Bluetooth module of a second system is turned on. A connection with the terminal is established by the second Bluetooth module controlled by the second system according to the terminal identifier.

18 Claims, 7 Drawing Sheets

(58) Field of Classification Search
USPC ........................................................ 455/41.2
See application file for complete search history.

(56) References Cited

U.S. PATENT DOCUMENTS

| | | | | |
|---|---|---|---|---|
| 11,032,766 | B2 * | 6/2021 | Murali | .............. H04W 52/0219 |
| 11,216,178 | B2 * | 1/2022 | Choi | .................... G06V 40/166 |
| 2008/0057868 | A1 * | 3/2008 | Chang | ................. H04B 17/318 |
| | | | | 455/41.2 |
| 2009/0207013 | A1 * | 8/2009 | Ayed | ................. G08B 21/0277 |
| | | | | 340/539.1 |
| 2011/0210830 | A1 * | 9/2011 | Talty | ....................... H04L 63/18 |
| | | | | 340/10.51 |
| 2011/0210831 | A1 * | 9/2011 | Talty | ................... H04W 12/50 |
| | | | | 340/10.51 |
| 2012/0096186 | A1 * | 4/2012 | Chang | ................. H04W 76/14 |
| | | | | 709/248 |
| 2012/0143707 | A1 * | 6/2012 | Jain | ....................... G07F 7/0893 |
| | | | | 455/552.1 |
| 2013/0169603 | A1 * | 7/2013 | Bae | ........................ G09G 5/005 |
| | | | | 345/204 |
| 2014/0334636 | A1 * | 11/2014 | Park | ........................ H04R 3/00 |
| | | | | 381/77 |
| 2015/0365892 | A1 * | 12/2015 | Ma | .................... H04W 52/0209 |
| | | | | 455/574 |
| 2016/0227351 | A1 * | 8/2016 | Gu | ............................ H04B 1/44 |
| 2016/0227354 | A1 * | 8/2016 | Zhao | ....................... H04W 4/80 |
| 2016/0354026 | A1 * | 12/2016 | Zohar | .................... B60N 2/976 |
| 2017/0093727 | A1 * | 3/2017 | Chen | ..................... H04W 76/10 |
| 2017/0177067 | A1 * | 6/2017 | Okada | .................. G06F 1/3212 |
| 2017/0188405 | A1 * | 6/2017 | Kapoor | .............. G08B 21/0277 |
| 2017/0236350 | A1 * | 8/2017 | Lin | .................... G07C 9/00309 |
| | | | | 340/5.61 |
| 2017/0272270 | A1 * | 9/2017 | Gu | ........................ H04B 17/318 |
| 2017/0280495 | A1 * | 9/2017 | Zhang | .............. H04M 1/72412 |
| 2018/0063859 | A1 * | 3/2018 | Anantharaman | . H04W 72/1215 |
| 2018/0103499 | A1 * | 4/2018 | Lee | ........................ H04W 76/15 |
| 2018/0267773 | A1 * | 9/2018 | Kim | ........................ G06F 3/0482 |
| 2018/0352583 | A1 * | 12/2018 | Smith | ..................... H04W 4/80 |
| 2018/0365970 | A1 * | 12/2018 | Anantharaman | ...... G08B 25/10 |
| 2019/0104404 | A1 * | 4/2019 | Tang | ....................... H04W 8/24 |
| 2019/0306905 | A1 * | 10/2019 | Lin | ....................... H04W 76/40 |
| 2019/0380018 | A1 * | 12/2019 | Tian | ........................ H04W 4/80 |
| 2020/0077246 | A1 * | 3/2020 | Mars | ...................... G06Q 40/02 |
| 2020/0382569 | A1 * | 12/2020 | Fornshell | ............ H04M 1/6066 |

FOREIGN PATENT DOCUMENTS

| | | |
|---|---|---|
| CN | 106452517 A | 2/2017 |
| CN | 106792491 A | 5/2017 |
| CN | 106919868 A | 7/2017 |
| CN | 109890022 A | 6/2019 |
| CN | 106658677 B | 10/2019 |

OTHER PUBLICATIONS

The first office action issued in corresponding CN application No. 201911365784.7 dated Jul. 26, 2022. 18 pages with English translation.

International search report issued in corresponding international application No. PCT/CN2020/135071 dated Mar. 10, 2021.

\* cited by examiner

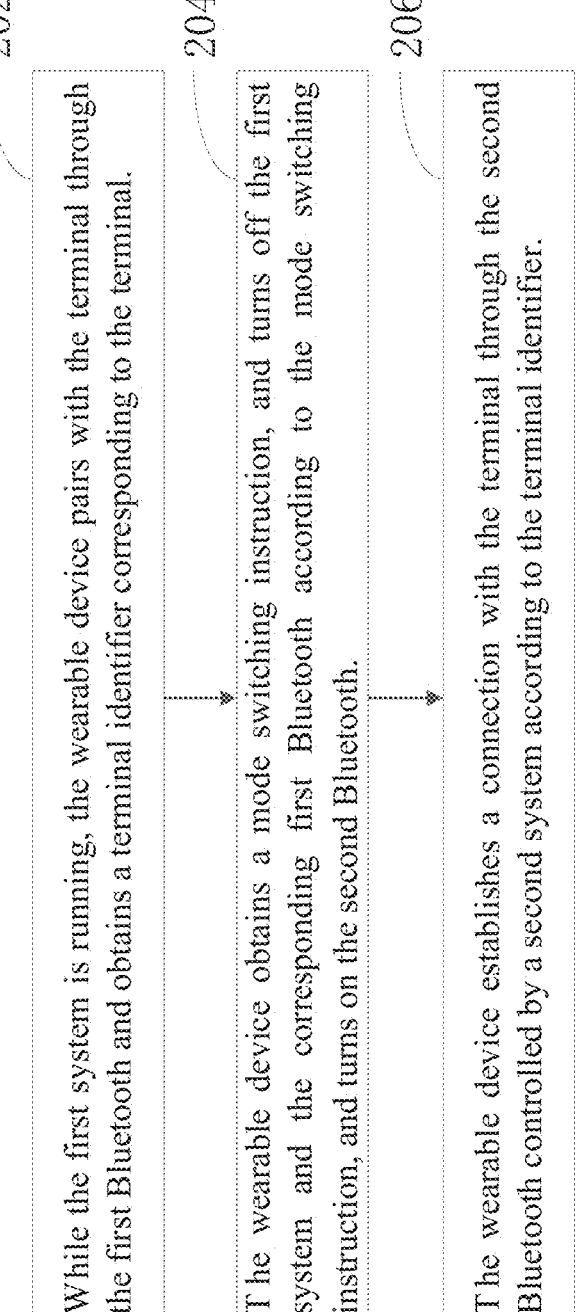

While the first system is running, the wearable device pairs with the terminal through the first Bluetooth and obtains a terminal identifier corresponding to the terminal. 202

The wearable device obtains a mode switching instruction, and turns off the first system and the corresponding first Bluetooth according to the mode switching instruction, and turns on the second Bluetooth. 204

The wearable device establishes a connection with the terminal through the second Bluetooth controlled by a second system according to the terminal identifier. 206

The wearable device may turn on the first Bluetooth while the first system is running.

304

The wearable device receives a pairing request sent by the terminal through the first Bluetooth.

306

In response to the pairing request, the wearable device may connect to the terminal through the first Bluetooth, and obtain a terminal identifier corresponding to the terminal.

| | Watch Mode | | Bracelet Mode | |
|---|---|---|---|---|
| | Android System | RTOS System | Android System | RTOS System |
| display screen | ✓ | | | ✓ |
| touch screen | ✓ | | | ✓ |
| heart rate sensor | | ✓ | | ✓ |
| acceleration + gyroscope | | ✓ | | ✓ |
| atmospheric pressure sensor | | ✓ | | ✓ |
| touch sensor | | ✓ | | ✓ |
| magnetic sensor | | ✓ | | ✓ |
| micro-pressure sensor | | ✓ | | ✓ |
| button | ✓ | | | ✓ |

FIG. 4

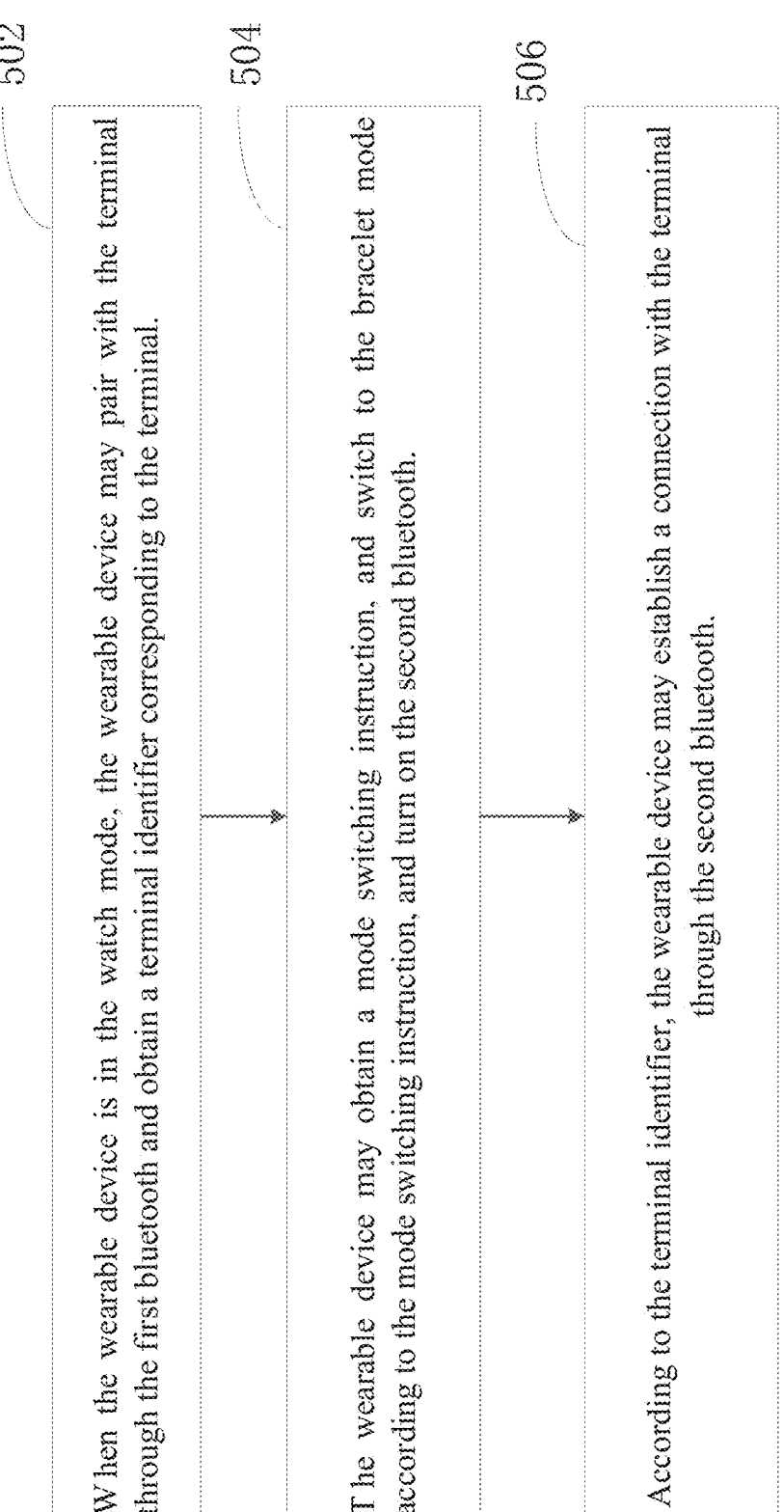

502

When the wearable device is in the watch mode, the wearable device may pair with the terminal through the first bluetooth and obtain a terminal identifier corresponding to the terminal.

504

The wearable device may obtain a mode switching instruction, and switch to the bracelet mode according to the mode switching instruction, and turn on the second bluetooth.

506

According to the terminal identifier, the wearable device may establish a connection with the terminal through the second bluetooth.

FIG. 5

BLUETOOTH CONNECTION METHOD AND APPARATUS, WEARABLE DEVICE, AND COMPUTER-READABLE STORAGE MEDIUM

CROSS-REFERENCE TO RELATED APPLICATIONS(S)

This application is a continuation of International Application No. PCT/CN2020/135071, filed on Dec. 10, 2020, which claims the priority of a Chinese Patent Application No. 201911365784.7, filed on Dec. 26, 2019, both of which are herein incorporated by reference in their entirety.

This application relates to wearable devices, and in particular to a Bluetooth™ connection method and device, wearable devices, and/or computer-readable storage medium.

BACKGROUND

With recent technology development, functions of wearable devices such as smart watches or bracelets are becoming more and more popular. The processor of the wearable device is connected with a Bluetooth™ module, and a communication connection may be established with a terminal through Bluetooth communication, so that data (such as media data and biometric data) may be transmitted between the wearable device and the terminal. Functions such as reminding and forwarding call information can also be enabled. Traditional wearable devices can have multiple operating systems. When a main operating system is turned off, corresponding Bluetooth function may not be carried over, and thus a problematic, abnormal Bluetooth communication can occur. Therefore, it is advantageous to have a system and method to address the foregoing issue.

SUMMARY

According to a first aspect of the present disclosure, embodiments of a method for Bluetooth connection are provided. The method includes the following features.

When a first (e.g., operating) system is running, a wearable device pairs with a terminal through a first Bluetooth communication, and obtains a terminal identifier corresponding to the terminal.

The wearable device obtains a mode switching instruction, and turns off the first system and the first Bluetooth communication according to the mode switching instruction, and turns on a second Bluetooth communication.

A wearable device establishes a connection to the terminal through the second Bluetooth communication controlled by a second (e.g., operating) system according to the terminal identifier.

According to a second aspect of the present disclosure, embodiments of a wearable device are provided. A wearable device can comprise a memory, a first processor, a second processor, and one or more programs (e.g., software). The one or more programs can include instructions stored in the memory and configured to be executed by the first processor and/or the second processor to perform the operations as follows.

When the first system is running, a wearable device pairs with a terminal through a first Bluetooth communication, and obtains a terminal identifier corresponding to the terminal.

The wearable device obtains a mode switching instruction, and turns off the first system and the first Bluetooth communication according to the mode switching instruction, and turns on a second Bluetooth communication.

A wearable device establishes a connection to the terminal through the second Bluetooth communication controlled by the second system according to the terminal identifier.

According to a third aspect of the present disclosure, embodiments of a non-transitory computer-readable storage medium are provided. The computer-readable storage medium has a computer program stored thereon, and the computer program is configured to be executed by a processor to perform the operations as follows.

When a first system is running, a wearable device pairs with a terminal through a first Bluetooth communication, and obtains a terminal identifier corresponding to the terminal.

The wearable device obtains a mode switching instruction, and turns off the first system and the first Bluetooth communication according to the mode switching instruction, and turns on a second Bluetooth communication.

A wearable device establishes a connection to the terminal through the second Bluetooth communication controlled by the second system according to the terminal identifier.

DRAWINGS

The present disclosure, in accordance with one or more various embodiments, is described in detail with reference to the following figures. The figures are provided for purposes of illustration only and merely depict typical or example embodiments.

FIG. 2 is a flowchart of a Bluetooth connection method according to an embodiment.

FIG. 4 is a schematic diagram of a function control system of a wearable device according to an embodiment.

FIG. 5 is a flowchart of a Bluetooth connection method according to an embodiment.

DETAILED DESCRIPTION

In order to make the purpose, technical solutions, and advantages of this application clearer and clearer, the following further describes the application in detail with reference to the accompanying drawings and embodiments. It should be understood that the specific embodiments described here are only used to explain the present application, and are not used to limit the present application.

It may be understood that the terms "first", "second", etc. used in this application may be used herein to describe various elements, but these elements are not limited by these terms. These terms are only used to distinguish the first element from another element. For example, without departing from the scope of the present application, the first processor may be referred to as the second processor, and similarly, the second processor may be referred to as the first processor. Both the first processor and the second processor are processors, but they are not the same processor.

Figure 1:
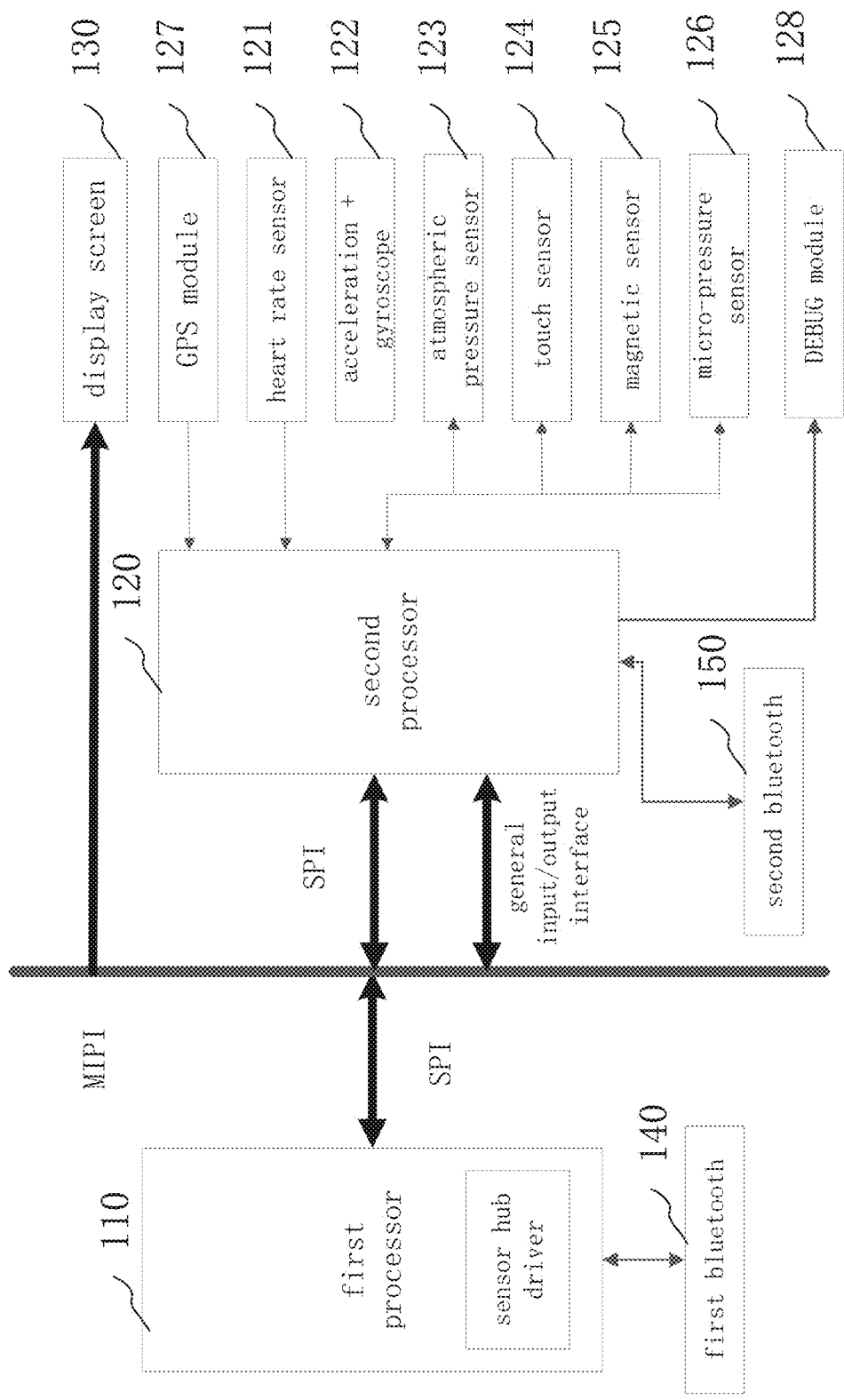
FIG. 1 is a schematic diagram of the internal structure of a wearable device according to an embodiment.

FIG. 1 is a schematic diagram of the internal structure of a wearable device according to an embodiment. As shown in FIG. 1, in one embodiment, the wearable device includes a first processor 110 and a second processor 120. The first processor 110 and the second processor 120 are both microprocessors, and the first processor 110 is a core processor. The first processor 110 and the second processor 120 may be configured with corresponding microprocessors according to actual applications, and the first processor 110 and the second processor 120 are not limited to the embodiments described herein. The first processor 110 is configured to run a first system, and the second processor 120 is configured to run a second system. The first processor 110 is a central processing unit, and the first system corresponding to the first processor 110 may be an Android system. The second processor 120 may be an MCU (Microcontroller Unit) processor. The second system corresponding to the second processor 120 may be an RTOS (Real Time Operating System) system.

The first system may be used to provide an abundant UI (User Interface) interactive interface, and the second system may be configured to obtain data provided by the sensor and corresponding operations. When the wearable device is in a non-working state or in a low battery state, the first system may be shut down, and only the second system of the wearable device is running. The second system may acquire, provide, and display basic operating resources, including acquiring basic sports health data and displaying the acquired data in a simple UI interface.

The wearable device may include one or more sensors such as a heart rate sensor 121, an acceleration+gyroscope 122, an atmospheric pressure sensor 123, a touch sensor 124, a magnetic sensor 125, and a micro-pressure sensor 126. The second processor 120 may be connected to a sensor included in the wearable device to obtain data collected by the sensor. The second processor 120 may also be connected to a GPS (Global Positioning System) module 127 to obtain positioning data received by the GPS antenna and be connected to a DEBUG module 128 for outputting debug data of the wearable device.

The first processor 110 and the second processor 120 are connected through an SPI (Serial Peripheral Interface), so that the first system and the second system may transmit communication data through an SPI bus. The display screen 130 is connected to the first processor 110 and the second processor 120 through an MIPI (Mobile Industry Processor Interface), and may display data output by the first processor 110 or the second processor 120. The first processor 110 also includes a sensor hub driver, which may be used to drive data collection and processing of each sensor.

In the embodiment of the present application, the wearable device further includes a first Bluetooth module (or component) 140 and a second Bluetooth module (or component) 150; the first Bluetooth module 140 is configured to connect to the first processor 110; the second Bluetooth module 150 is configured to connect to the second processor 120. The first Bluetooth module 140 may be a dual-mode Bluetooth module, and the second Bluetooth module 150 may be a Bluetooth Low Energy (BLE) module. The dual-mode Bluetooth module may support classic Bluetooth (Basic Rate, BR) and low energy Bluetooth communications/transmissions. Classic Bluetooth may be used to transmit audio, video and other data with a large amount of data; Bluetooth Low Energy may be used to transmit data with a small amount of data, such as data provided by sensors, remote control data, etc. When the first system is running, the wearable device may turn on the first Bluetooth module 140 and communicate with other devices through the first Bluetooth module 140. At this time, the second Bluetooth module 150 is turned off. When the first system is turned off, the first Bluetooth module 140 is turned off. The wearable device may turn on the second Bluetooth module 150 and communicate with other devices through the second Bluetooth module 150.

FIG. 2 is a flowchart of a Bluetooth connection method according to an embodiment. The method for Bluetooth connection in this embodiment is described by taking the operation and the above-mentioned wearable device as an example. As shown in FIG. 2, the Bluetooth connection method includes block 202 to block 206.

At block 202, when a first system is running, a wearable device pairs with a terminal through a first Bluetooth communication and obtains a terminal identifier corresponding to the terminal.

The terminal may be an electronic device such as a mobile phone, a wearable device, and a personal computer. Pairing refers to the operation of at least two electronic devices performing communication authentication. After the wearable device is paired with the terminal through the first Bluetooth communication, the pairing information of the terminal is saved, and the wearable device may directly connect to the terminal through the first Bluetooth communication according to the pairing information. And there is no need to connect perform authentication at each time of connection. The pairing information includes the terminal identifier. The terminal identifier can be a unique identifier of the terminal. Optionally, the terminal identifier may be a physical address (Media Access Control Address) corresponding to the terminal.

The wearable device may pair with the terminal through the first Bluetooth communication when the first system is running, and obtain a terminal identification corresponding to the terminal. The wearable device may turn on the first Bluetooth communication through the first system, and the terminal also turns on a corresponding Bluetooth function. Then through the Bluetooth function of the wearable device or the terminal, the wearable device or the terminal may scan the signal and initiates a pairing request to each other. The device received the pairing request may respond to the pairing request and complete the corresponding pairing operation according to the pairing mode corresponding to the pairing request. After the pairing is completed, the terminal and the wearable device may communicate with each other wirelessly, and the wearable device may obtain and save the terminal identifier of the terminal.

In one embodiment, the wearable device includes a memory shared by the first system and the second system, and the wearable device may save the terminal identifier in the shared memory through the first system.

In one embodiment, the wearable device may also send the obtained terminal identifier to the second system, and save the terminal identifier through the second system.

At block 204, the wearable device obtains a mode switching instruction, and turns off the first system and the corresponding first Bluetooth communication according to the mode switching instruction, and turns on the second Bluetooth communication.

A mode switching instruction is for instructing the wearable device to switch the operating mode. Specifically, the mode switching instruction may be generated by the user by pressing a button of the wearable device, or may be generated by touching a control on the touch screen of the wearable device, etc., and the wearable device may obtain and generate the mode switching instruction. The wearable device includes a first system and a second system. Corresponding to the shutdown and running of the two systems, the wearable device may have different operating modes.

The operating mode of the wearable device may be switched based on a mode switching instruction.

In this embodiment, the wearable device obtains the mode switching instruction when the first system is running, and the wearable device may shut down the first system according to the mode switching instruction. At this time, the first Bluetooth communication connected to the first processor corresponding to the first system is also turned off, and the wearable device may turn on the second Bluetooth communication connected to the second processor corresponding to the second system.

In one embodiment, the wearable device may determine whether the wearable device is connected to the terminal through the first Bluetooth communication before the first system is shut down. If so, the wearable device may turn on the second Bluetooth communication when the first system is shut down; if not, the wearable device may only turn off the first system. When the Bluetooth turning-on instruction is obtained, the wearable device may turn on the second Bluetooth when the first system is turned off.

At block 206, the wearable device establishes a connection with the terminal through the second Bluetooth communication controlled by a second system according to the terminal identifier.

After the wearable device closes the first system, the operating system of the wearable device is the second system. The wearable device may establish a connection with the terminal through the second system. The wearable device may initiatively broadcast through the second Bluetooth communication, that is, establishing a connection with the terminal according to the terminal identifier.

Further, the first Bluetooth communication and the second Bluetooth communication may adopt the same application layer protocol. When the wearable device turns on the second Bluetooth communication, it lifts the Bluetooth protocol stack and invokes the function of the second Bluetooth communication. If before the mode switch, the wearable device performs data transmission with the terminal through the first Bluetooth communication. When a connection is established with the terminal through the second Bluetooth communication, the wearable device may perform the same data transmission through the second Bluetooth communication.

In the embodiment provided by this application, while the first system is running, the first Bluetooth communication is used to pair with the terminal and the wearable device may obtain the terminal identifier corresponding to the terminal. When the mode switching instruction is obtained, the wearable device may shut down the first system and the first Bluetooth communication according to the mode switching instruction, and turn on the second Bluetooth communication. The wearable device may establish a connection with the terminal through the second Bluetooth communication by the second system according to the terminal identifier. That is, the wearable device may be paired through the first Bluetooth communication and obtain the terminal identifier. When the first system is turned off, the wearable device may establish a connection with the terminal through the second Bluetooth communication controlled by the second system according to the saved terminal identifier. It may ensure that the Bluetooth communication of the wearable device is normal, and avoid the disconnection due to the shutdown of the first system and avoid affecting the operation of the wearable device.

Figure 3:
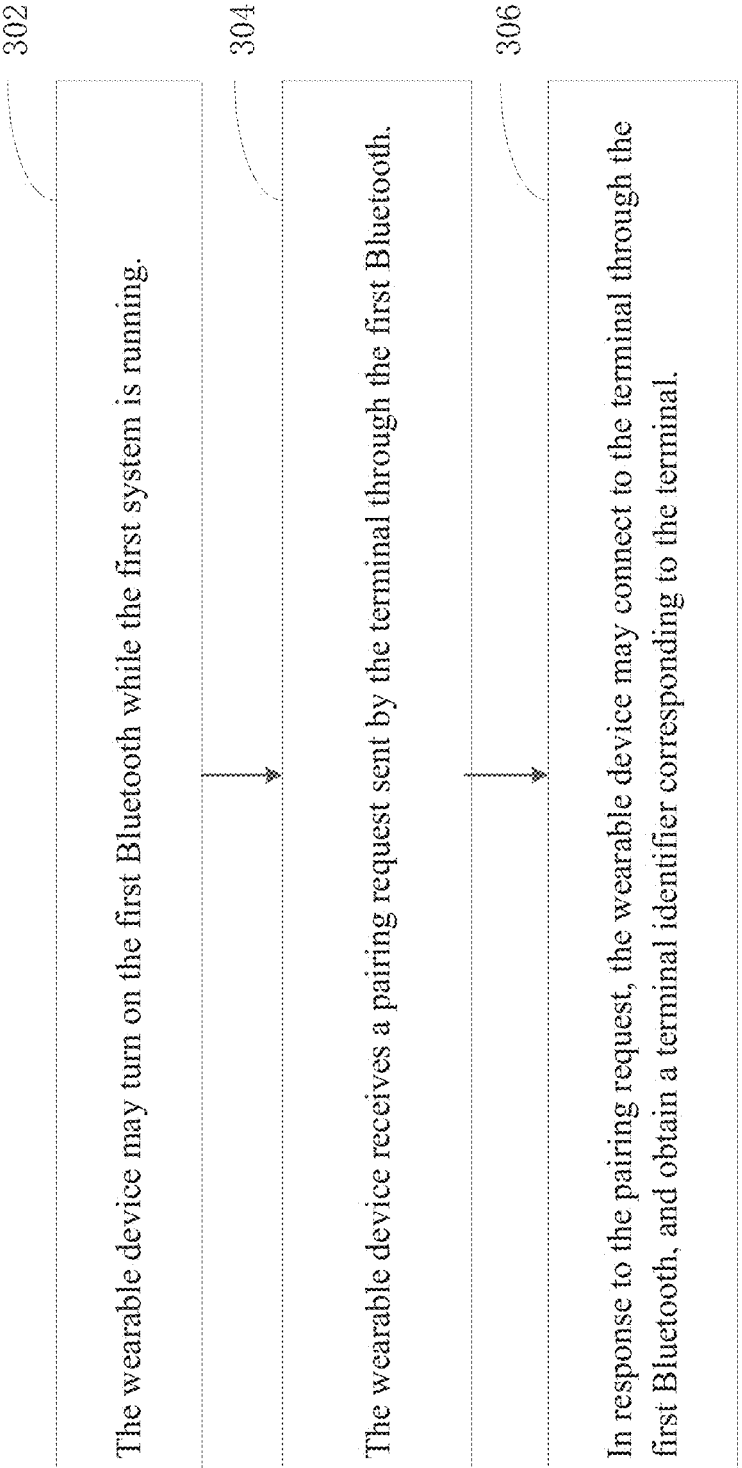
FIG. 3 is a flowchart of pairing between a wearable device and a terminal according to an embodiment.

FIG. 3 is a flowchart of pairing between a wearable device and a terminal in an embodiment. FIG. 3, in one embodiment, illustrates the process discussed in the above block 202 for Bluetooth connection.

At block 302, the wearable device may turn on the first Bluetooth communication when the first system is running.

In an embodiment, the wearable device may turn on the first Bluetooth communication when the first system is turned on; or after the first system is on, the first Bluetooth communication may be turned on according to the acquired Bluetooth turning-on instruction.

At block 304, the wearable device receives a pairing request sent by the terminal through the first Bluetooth communication.

After the wearable device turns on the first Bluetooth communication, it may send a signal broadcast through the first Bluetooth communication. The terminal may call and discover the device by scanning through the Bluetooth module. In an embodiment, the terminal may display the signal obtained by scanning on its interface. In response to obtaining the user's confirmation indication to the signal of the wearable device, the terminal generates a pairing request sent to the first Bluetooth communication of the wearable device, and the wearable device may receive the pairing request.

At block 306, in response to the pairing request, the wearable device may connect to the terminal through the first Bluetooth communication, and obtain a terminal identifier corresponding to the terminal.

The wearable device responds to the pairing request. In an embodiment, the wearable device may generate an indicator corresponding to the pairing request, such as displaying the pairing request on the interface of the wearable device, or flashing an indicator light, etc., to obtain the user's confirmation indication of the pairing request. And then, the wearable device responds to the pairing request according to the confirmation indication to connect to the terminal through the first Bluetooth communication.

In some embodiments, the pairing request sent by the terminal includes pairing information, and the wearable device may respond to the pairing request according to the included pairing information. For example, the pairing information may return a verification identifier; the wearable device may obtain the verification identifier according to the pairing information, and return it to the terminal according to the verification identifier.

By turning on the first Bluetooth communication while the first system is running, the pairing request sent by the terminal for the first Bluetooth communication is received, and the pairing request is responded to connect to the terminal through the first Bluetooth and obtain the terminal identifier corresponding to the terminal. It may avoid the problem of initiatively scanning by the wearable device, which is limited by the screen size of the wearable device, resulting in incomplete information display and cumbersome operation.

In one embodiment, the above block 206 in the provided method for Bluetooth connection may include: the wearable device may generate a connection request according to the terminal identifier through the second Bluetooth communication and broadcast a connection request by a signal. The connection request is used to indicate the terminal corresponding to the terminal identifier to response the connection request, so that to establish the connection between the wearable device and the terminal.

The wearable device may automatically generate a connection request according to the terminal identifier after turning on the second Bluetooth communication, and broadcast the connection request by a signal broadcast. The signal broadcast is a connectable directional broadcast, that is, the connection request contains the terminal identifier, which may be received and responded to by the terminal corresponding to the terminal identifier, so that the terminal and the wearable device may quickly establish a connection without user involvement. The operation will not affect other functions of the wearable device.

In one embodiment, before acquiring the mode switching instruction in the provided Bluetooth connection method, the method further includes: obtaining a remaining power value of the wearable device, and when the remaining power value is lower than the power threshold, generating the mode switching instruction.

The remaining power value of the wearable device refers to a ratio of the available power in the battery of the wearable device to a nominal capacity. The power threshold may be determined according to actual usage requirements. For example, the power threshold may be 10%, 15%, 20%, 30%, etc., which are only examples and are not limiting. The first system may provide more complete functions for the wearable device, and the second system provides the basic functions of the wearable device. The wearable device's power consumption when running the first system can be greater than the power consumption when running the second system.

The wearable device may detect the remaining power value in real time, and when the remaining power value is lower than the power threshold, a mode switching instruction is generated, and the first system may be shut down according to the mode switching instruction to reduce the power consumption of the wearable device.

In one embodiment, the wearable device includes a watch mode and a bracelet mode. When the wearable device is in the watch mode, the first system and the second system run simultaneously; when the wearable device is in the bracelet mode, the first system is closed, and the second system is running.

In one embodiment, the first system is the main operating system of the wearable device and may provide relatively complete functions for the wearable device. The second system can be an auxiliary operating system of the wearable device and may provide the basic functions of the wearable device. When the wearable device switches from a watch mode (e.g., use the wearable device as a watch) to a bracelet mode (e.g., use the wearable device as a bracelet), the first system may be shut down and the second system may keep running. When the wearable device switches from the bracelet mode to the watch mode, the first system and the second system are both enabled. In an embodiment, when the first system is turned off, the first Bluetooth is also turned off.

In this embodiment, the process of shutting down the first system according to the mode switch instruction in the provided method for Bluetooth connection includes: when the wearable device is in the watch mode, the peripheral components of the wearable device are switched from controlled by the first system to controlled by the second system according to the mode switch instruction. And the first system is turned off, so that to switch wearable device to the bracelet mode.

The peripheral components of the wearable device may include a display screen, a touch screen, and buttons. FIG. 4 is a schematic diagram of a function control system of a wearable device in an embodiment. As shown in Fig., a first system can be the Android system and a second system can be the RTOS system as an example. The watch mode is that the wearable device runs both Android and RTOS systems at the same time, and the bracelet mode is that the wearable device turns off Android System, and only run RTOS system. The heart rate sensor, ECG sensor, motion sensor and other sensors are controlled by the RTOS system in both watch mode and bracelet mode. The display, touch screen, and buttons may be controlled by different systems in different modes, that is, in the watch mode, the display, touch screen, and buttons may be controlled by the Android system; in bracelet mode, the display, touch screen and buttons may be controlled by the RTOS system.

When the current operating mode is the watch mode, the peripheral components of the wearable device are switched from controlled by the first system to controlled by the second system. When the first system is turned off, the wearable device may be switched to the second system, so that to reduce power consumption of peripheral components.

FIG. 5 is a flowchart of a method for Bluetooth connection in an embodiment. As shown in FIG. 5, in one embodiment, the provided method for Bluetooth connection is performed by the above-mentioned wearable device, and the Bluetooth connection method includes the following.

At block 502, when the wearable device is in the watch mode, the wearable device may pair with the terminal through the first Bluetooth communication and obtain a terminal identifier corresponding to the terminal.

At block 504, the wearable device may obtain a mode switching instruction, and switch to the bracelet mode according to the mode switching instruction, and turn on the second Bluetooth communication.

At block 506, according to the terminal identifier, the wearable device may establish a connection with the terminal through the second Bluetooth communication.

When the wearable device is in the watch mode, the terminal identifier may be obtained by pairing through the first Bluetooth communication. When the operation mode of the wearable device is changed, that is, when switching from the watch mode to the bracelet mode, the wearable device establishes a connection with the terminal through the second Bluetooth communication, which may realize uninterrupted communication between the wearable device and the terminal when the mode is switched. The connection process is simple and does not need to perform operations such as pairing verification again.

In one embodiment, the method for Bluetooth connection may further include: when the wearable device is in the bracelet mode, in response to a mode switching instruction is obtained, the peripheral components of the wearable device is switched from controlled by the second system to by the first system, so that to switch the wearable device to the watch mode and the first Bluetooth communication is turned on. According to the terminal identifier, the wearable device may establish a connection with the terminal through the first Bluetooth communication.

When the wearable device is in the bracelet mode, the mode switching instruction acquired by the wearable device is used to switch the wearable device from the bracelet mode to the watch mode. In an embodiment, the wearable device turns on the first system and switches the peripheral components from controlled by the first system to by the second system control, and the first Bluetooth communication corresponding to the first system is activated, so that to establish a connection with the terminal.

When the wearable device is switched from the bracelet mode to the watch mode, the second Bluetooth communication may be turned off through the second system, and the first Bluetooth communication corresponding to the first system may be turned on. According to the terminal identifier stored in the first system, the wearable device may establish a connection with the terminal by the first Bluetooth, so as to perform data transmission with a large amount of data and a high rate. The wearable device may obtain the terminal identifier from the shared memory through the first system, or may obtain the terminal identifier from the memory corresponding to the first processor.

In an embodiment, the first processor and the second processor are connected through a serial peripheral interface bus; before acquiring the mode switching instruction in the Bluetooth connection method, the method may further include: the terminal identifier is sent to the second system, and the terminal identifier is stored by the second system.

In an embodiment, the terminal identifier is sent to the second processor through the serial peripheral interface bus. The terminal identifier is stored in the corresponding memory through the second processor.

The first processor and the second processor are connected through a serial peripheral interface bus. The first processor can be an ARM (Advanced RISC Machines, reduced instruction set machine) processor, and the processor where the second system is located can be an MCU processor, as an example. The ARM processor and the MCU processor may be connected through the serial peripheral interface bus, that is, the SPI bus, and the data may be transmitted through the SPI bus.

In this embodiment, the wearable device may send the obtained terminal identifier through the first system to the second processor where the second system is located via the SPI bus, and the terminal identifier may be stored in the memory in the second processor. The memory may be a flash memory or other non-transitory memory, which is not limiting here.

Figure 6:
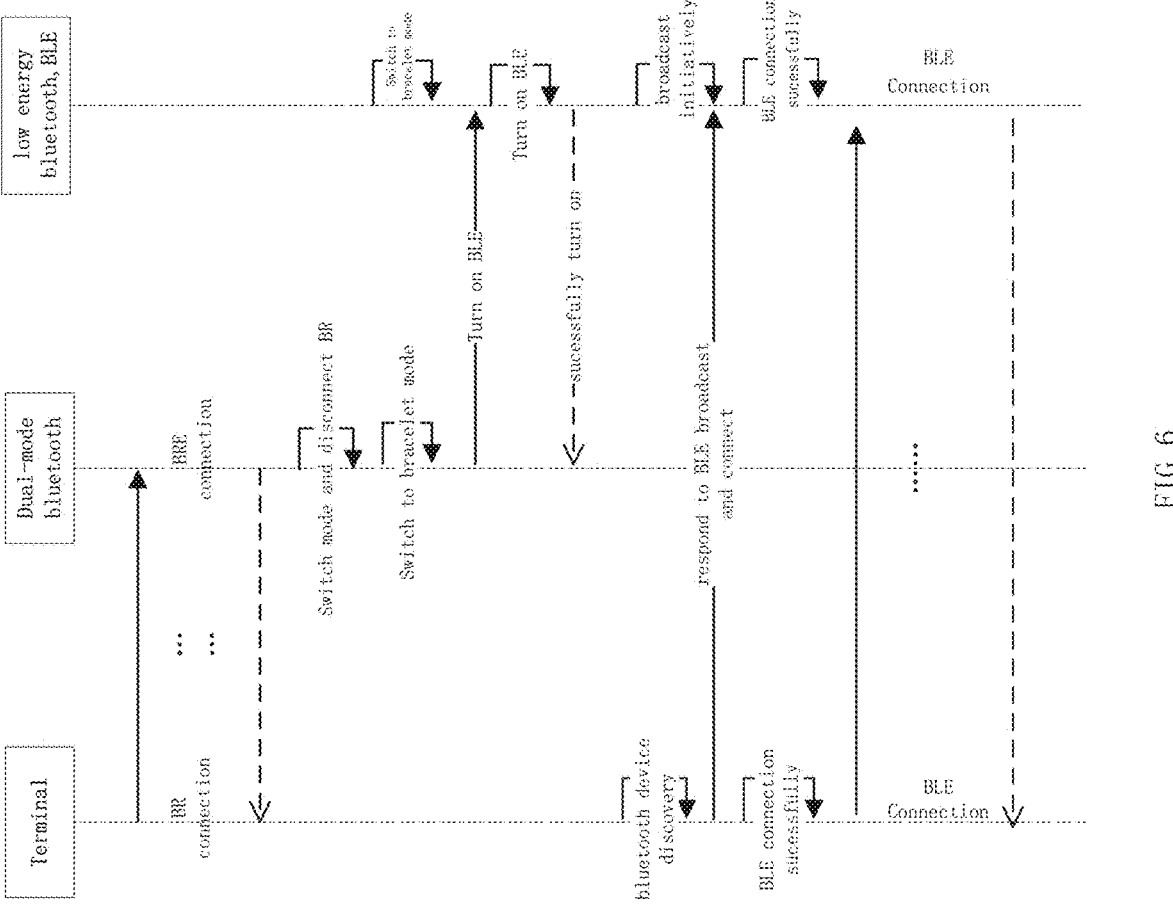
FIG. 6 is a sequence diagram of a Bluetooth connection method according to an embodiment.

FIG. 6 is a sequence diagram of a method for Bluetooth connection in an embodiment. As shown in FIG. 6, in one embodiment, the provided method for Bluetooth connection is described by taking the first Bluetooth communication as a dual-mode Bluetooth communication and the second Bluetooth communication as a low energy Bluetooth communication, including operations as follows.

In an embodiment, the wearable device may establish a Bluetooth connection with the terminal through dual-mode Bluetooth communication, and may transmit audio data, video data and other data with the terminal. It may also realize the reception or transmission of remote-control data through the "BLE" function of dual-mode Bluetooth communication, or perform low-volume data transmission, etc.

The wearable device may turn off the first system and dual-mode Bluetooth communication when the battery is low or when the mode switching instruction input by the user is obtained, so as to disconnect the Bluetooth connection between the dual-mode Bluetooth communication and the terminal. The wearable device is switched to the bracelet mode, and turns on Bluetooth Low Energy.

Bluetooth low energy may initiatively broadcast a signal according to the terminal identifier stored in the second system, and the terminal may scan to find the broadcast information and respond to the broadcast signal. Therefore, the wearable device may establish a connection with the terminal through the second Bluetooth.

Further, the wearable device may communicate with the terminal to perform data transmission or control functions.

It should be understood that although the operations in the flowcharts of FIGS. 2, 3, and 5 are displayed in sequence as indicated by the arrows, these operations are not necessarily executed in sequence in the order indicated by the arrows. Unless specifically stated in the specification, the execution of these operations is not strictly limited in order, and these operations may be executed in other orders. Moreover, at least some of the operations in FIGS. 2, 3, and 5 may include multiple sub-operations or multiple stages. These sub-operations or stages are not necessarily executed at the same time, but may be executed at different times. The execution order of these sub-operations or the stages is not necessarily carried out sequentially, but may be executed alternately with at least a part of other operations or sub-operations or stages of other steps.

Figure 7:
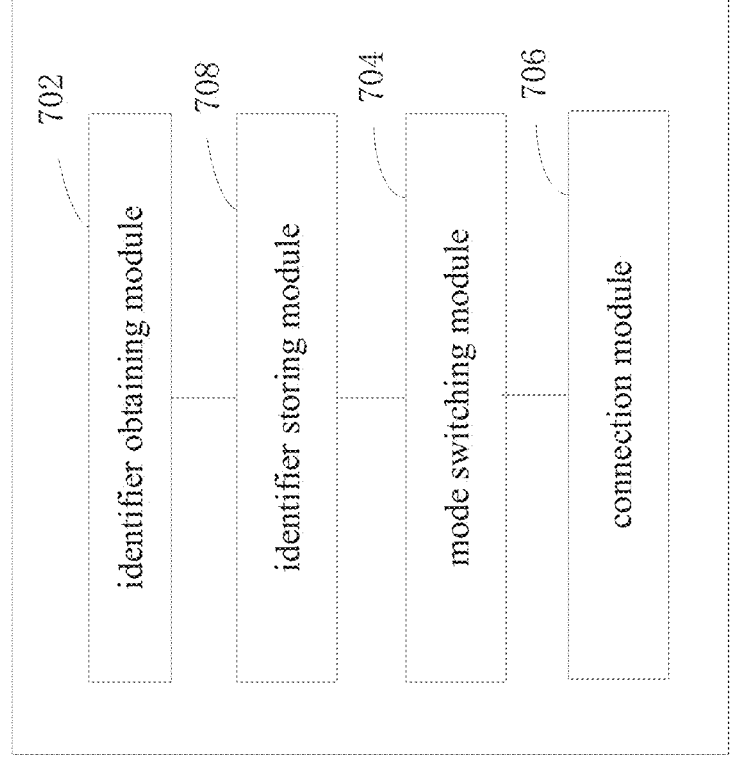
FIG. 7 is a structural block diagram of a Bluetooth connection device according to an embodiment.

FIG. 7 is a structural block diagram of a Bluetooth connection apparatus according to an embodiment. As shown in FIG. 7, the Bluetooth connection apparatus includes an identifier obtaining module 702, a mode switching module 704, and a connection module 706.

The identifier obtaining module 702 is configured to pair with the terminal through a first Bluetooth communication and obtain a terminal identifier corresponding to the terminal while a first system is running.

The mode switching module 704 is configured to obtain a mode switching instruction, shut down the first system according to the mode switching instruction, and turn on a second Bluetooth communication.

The connection module 706 is configured to establish a connection with the terminal through the second Bluetooth communication according to the terminal identifier.

The Bluetooth connection apparatus provided in this embodiment may cause the wearable device to pair through the first Bluetooth communication and obtain the terminal identifier. When the first system is closed, the wearable device may establish a connection with the terminal through the second Bluetooth communication controlled by the second system according to the saved terminal identifier. It may ensure that the Bluetooth communication of the wearable device is normal, and avoid the disconnection due to the shutdown of the first system and avoid affecting the operation of the wearable device.

In one embodiment, the identifier obtaining module 702 may also be configured to turn on the first Bluetooth communication while the first system is running, and receive a pairing request sent by the terminal for the first Bluetooth communication. In response to the pairing request, the identifier obtaining module may also be configured to connect to the terminal through the first Bluetooth communication, obtain the terminal identifier corresponding to the terminal.

In one embodiment, the connection module 706 may also be configured to generate a connection request according to the terminal identifier through the second Bluetooth communication, and broadcast the connection request by signal. The connection request is to instruct the terminal corresponding to the terminal identifier to respond to the connection request, so that to establish the connection with the wearable device.

In one embodiment, the mode switching module 704 may also be configured to obtain the remaining power value of the wearable device. When the remaining power value is lower than the power threshold, a mode switching instruction is generated.

In one embodiment, when the wearable device is in the watch mode, the mode switching module 704 may also be configured to switch the peripheral components of the wearable device from controlled by the first system to controlled by the second system according to the mode switching instruction, so that to switch the wearable device to the bracelet mode. And the connection module is configured to shut down the first system, and establish a connection with the terminal through the first Bluetooth communication.

In one embodiment, while the wearable device is in the bracelet mode, the mode switching module 704 may also be configured to switch the peripheral components of the wearable device from controlled by the second system to controlled by the first system in response to the mode switching instruction being obtained, and switch the wearable device to the watch mode and turn on the first Bluetooth communication. The connection module 706 is configured to establish a connection with the terminal through the first Bluetooth communication according to the terminal identifier.

In one embodiment, the provided Bluetooth connection apparatus may further include an identifier storing module 708, which is configured to send the terminal identifier to the second processor through the serial peripheral interface bus, and store the terminal identifier in the memory corresponding to the second processor through the second processor.

The division of the modules in the above Bluetooth connection apparatus is only used as an example. In other embodiments, the Bluetooth connection apparatus may be divided into different modules as needed to complete all or part of the functions of the above Bluetooth connection apparatus.

For the specific limitation of the Bluetooth connection apparatus, please refer to the above limitation of the Bluetooth connection method, which will not be repeated here. Each module in the above-mentioned Bluetooth connection apparatus may be implemented in whole or in part by software, hardware and a combination thereof. The above-mentioned modules may be embedded in the form of hardware or independent of the processor in the computer equipment, or may be stored in the memory of the computer equipment in the form of software, so that the processor may call and execute the operations corresponding to the above-mentioned modules.

The implementation of each module in the Bluetooth connection apparatus provided in the embodiment of the present application may be in the form of a computer program. The computer program may be run on a wearable device. The program module composed of the computer program may be stored in the memory of the wearable device. When the computer program is executed by the processor, it realizes the operations of the method described in the embodiments of the present application.

The embodiment of the present application also provides a computer-readable storage medium. One or more non-transitory computer-readable storage media containing computer-executable instructions, when the computer-executable instructions are executed by one or more processors, cause the processors to execute the operations of the method for Bluetooth connection.

A computer program product containing instructions that, when running on a computer, causes the computer to execute the method for Bluetooth connection.

Any reference to memory, storage, database, or other media used in this application may include non-transitory and/or transitory memory. Non-transitory memory may include read only memory (ROM), programmable ROM (PROM), electrically programmable ROM (EPROM), electrically erasable programmable ROM (EEPROM), or flash memory. Transitory memory may include random access memory (RAM), which acts as external cache memory. As an illustration and not a limitation, RAM is available in many forms, such as static RAM (SRAM), dynamic RAM (DRAM), synchronous DRAM (SDRAM), double data rate SDRAM (DDR SDRAM), enhanced SDRAM (ESDRAM), synchronous Link (Synchlink) DRAM (SLDRAM), memory bus (Rambus) direct RAM (RDRAM), direct memory bus dynamic RAM (DRDRAM), and memory bus dynamic RAM (RDRAM).

The above examples only express a few implementations of the present application, and the description is relatively specific and detailed, but it should not be understood as a limitation to the patent scope of the present application. It should be noted that for those of ordinary skill in the art, without departing from the concept of this application, several modifications and improvements may be made, and these all fall within the protection scope of this application. Therefore, the scope of protection of the patent of this application shall be subject to the appended claims.

What is claimed is:

1. A method for Bluetooth connection, performed by a wearable device comprising a first processor, a second processor, a first Bluetooth module, and a second Bluetooth module, the first processor being configured to run a first system, the second processor being configured to run a second system, the first processor being configured to communicate with the first Bluetooth module, the second processor being configured to communicate with the second Bluetooth module, the method comprising:

when the first system is running, pairing with a terminal through the first Bluetooth module so as to obtain a terminal identifier corresponding to the terminal;

in response to a mode switching instruction, turning off the first system and the first Bluetooth module and turning on the second Bluetooth module; and establishing, by the second system, a connection to the terminal through the second Bluetooth module according to the terminal identifier;

wherein the method further comprises:

when the first system is running, after pairing with the terminal through the first Bluetooth module and obtaining the terminal identifier corresponding to the terminal, sending the terminal identifier to the second system, and storing the terminal identifier through the second system; or before obtaining the mode switching instruction, obtaining a remaining power value of the wearable device; and in response to the remaining power value being lower than a power threshold, generating the mode switching instruction; or before obtaining the mode switching instruction, sending the terminal identifier to the second processor through a serial peripheral interface bus, wherein the first processor and the second processor are connected through the serial peripheral interface bus; and storing the terminal identifier in a memory corresponding to the second processor by the second processor.

2. The method according to claim 1, wherein when the first system is running, pairing with the terminal through the first Bluetooth module and obtaining the terminal identifier corresponding to the terminal comprises:

while the first system is running, turning on the first Bluetooth module;

receiving a pairing request for the first Bluetooth module from the terminal; and in response to the pairing request, connecting to the terminal through the first Bluetooth module, and obtaining the terminal identifier corresponding to the terminal.

3. The method according to claim 1, wherein the wearable device comprises a memory shared by the first system and the second system, the method further comprising:

when the first system is running, after pairing with the terminal through the first Bluetooth module and obtaining the terminal identifier corresponding to the terminal; and storing the terminal identifier in the shared memory through the first system.

4. The method according to claim 1, wherein obtaining the mode switching instruction, turning off the first system and the first Bluetooth module according to the mode switching instruction, and turning on the second Bluetooth module, comprises:

in response to the mode switching instruction, determining whether the wearable device is connected to the terminal through the first Bluetooth module;

if the wearable device being connected to the terminal through the first Bluetooth module, turning on the second Bluetooth module and turning off the first system; and if the wearable device is not connected to the terminal through the first Bluetooth module, turning off the first system, and in response to a Bluetooth turning-on instruction being obtained, turning on the second Bluetooth module.

5. The method according to claim 1, wherein the first Bluetooth module and the second Bluetooth module adopt the same application layer protocol, the method further comprising:

before establishing, by the second system, a connection to the terminal through the second Bluetooth module according to the terminal identifier, transmitting data with the terminal through the first Bluetooth module;

in response to the connection to the terminal through the second Bluetooth module being established, continuing transmitting the data through the second Bluetooth module.

6. The method according to claim 1, wherein the establishing, by the second system, the connection to the terminal through the second Bluetooth module according to the terminal identifier, comprising:

generating a connection request according to the terminal identifier through the second Bluetooth module;

broadcasting the connection request, the connection request being configured to instruct the terminal corresponding to the terminal identifier to respond to the connection request.

7. The method according to claim 1, wherein the wearable device comprises a watch mode and a bracelet mode, and when the wearable device is in the watch mode, the first system and the second system run simultaneously; when the wearable device is in the bracelet mode, the first system is turned off and the second system is running;

turning off the first system and the first Bluetooth module according to the mode switching instruction, comprises:

while the wearable device is in the watch mode, according to the mode switching instruction, controlling peripheral components of the wearable device from using the first system to using the second system, and turning off the first system and the first Bluetooth module.

8. The method according to claim 7, further comprising:

when the wearable device is in the bracelet mode, in response to obtaining the mode switching instruction, controlling the peripheral components of the wearable device from using the second system to using the first system, and turning on the first Bluetooth module;

establishing the connection to the terminal through the first Bluetooth module according to the terminal identifier.

9. A non-transitory computer-readable storage medium having a computer program stored thereon, wherein the computer program is configured to be executed by a wearable device to cause the wearable device to execute the method of claim 1.

10. A wearable device, comprising:

a memory;

a first processor;

a second processor;

one or more programs, wherein the one or more programs including instructions are stored in the memory and configured to be executed by the first processor or the second processor to cause the wearable device to:

when the first system is running, pair with a terminal through the first Bluetooth module to obtain a terminal identifier corresponding to the terminal;

in response to a mode switching instruction, turn off the first system and the first Bluetooth module and turn on the second Bluetooth module; and establish, by the second system, a connection to the terminal through the second Bluetooth module according to the terminal identifier;

wherein in terms of obtaining the mode switching instruction, turning off the first system and the first Bluetooth module according to the mode switching instruction, and turning on the second Bluetooth module, the instructions are configured to be executed to cause the wearable device to: in response to the mode switching instruction, determine whether the wearable device is connected to the terminal through the first Bluetooth module; if the wearable device being connected to the terminal through the first Bluetooth module, turn on the second Bluetooth module and turning off the first system; and if the wearable device is not connected to the terminal through the first Bluetooth module, turn off the first system, and in response to a Bluetooth turning-on instruction being obtained, turning on the second Bluetooth module; or wherein the wearable device comprises a watch mode and a bracelet mode, and when the wearable device is in the watch mode, the first system and the second system run simultaneously; when the wearable device is in the bracelet mode, the first system is turned off and the second system is running; in terms of turning off the first system and the first Bluetooth module according to the mode switching instruction, the instructions are configured to be executed to cause the wearable device to: while the wearable device is in the watch mode, according to the mode switching instruction, controlling peripheral components of the wearable device from using the first system to using the second system, and turning off the first system and the first Bluetooth module.

11. The wearable device according to claim 10, wherein in terms of pairing with the terminal through the first Bluetooth module when the first system is running and obtaining the terminal identifier corresponding to the terminal, the instructions are configured to be executed to cause the wearable device to:

when the first system is running, turn on the first Bluetooth module;

receive a pairing request sent by the terminal for the first Bluetooth module; and in response to the pairing request, connect to the terminal through the first Bluetooth module, and obtain the terminal identifier corresponding to the terminal.

12. The wearable device according to claim 10, wherein in terms of establishing the connection to the terminal through the second Bluetooth module according to the terminal identifier, the instructions are configured to be executed to cause the wearable device to:

generate a connection request according to the terminal identifier through the second Bluetooth module;

broadcast the connection request, the connection request being configured to instruct the terminal corresponding to the terminal identifier to respond to the connection request.

13. The wearable device according to claim 10, the instructions are further configured to be executed to cause the wearable device to:

obtain a remaining power value of the wearable device; and in response to the remaining power value being lower than a power threshold, generate the mode switching instruction.

14. The wearable device according to claim 10, while the wearable device is in the bracelet mode, in response to obtaining the mode switching instruction, the instructions further executed by the one or more processors to:

control the peripheral components of the wearable device from using the second system to using the first system, and to turn on the first Bluetooth module;

establish the connection to the terminal through the first Bluetooth module according to the terminal identifier.

15. The wearable device according to claim 10, wherein the first processor and the second processor are connected through a serial peripheral interface bus, the instructions are further configured to be executed to cause the wearable device to:

before the obtain the mode switching instruction, send the terminal identifier to the second processor through the serial peripheral interface bus; and store the terminal identifier in a memory corresponding to the second processor by the second processor.

16. A method for system switching, performed by a wearable device comprising a first processor and a second processor, the first processor being configured to run a first system, the second processor being configured to run a second system, the method comprising:

obtaining a remaining power value of the wearable device;

in response to the remaining power value being lower than a power threshold, generating a mode switching instruction; and in response to the mode switching instruction, turning off the first system;

wherein power consumption of the wearable device when running the first system is greater than the power consumption of the wearable device when running the second system.

17. The method according to claim 16, wherein when mode switching instruction is generated, the first system is running, or both the first system and the second system are running.

18. The method according to claim 16, wherein the wearable device comprises a watch mode and a bracelet mode, and when the wearable device is in the watch mode, the first system and the second system run simultaneously; when the wearable device is in the bracelet mode, the first system is turned off and the second system is running;

turning off the first system in response to the mode switching instruction, comprises:

while the wearable device is in the watch mode, according to the mode switching instruction, controlling peripheral components of the wearable device from using the first system to using the second system, and turning off the first system.

\* \* \* \* \*